(12) United States Patent
Sundet

(10) Patent No.: US 7,377,174 B2
(45) Date of Patent: May 27, 2008

(54) CAPILLARY WELD EXTENSION WITH THERMAL ISOLATION

(75) Inventor: Paul Sundet, Savage, MN (US)

(73) Assignee: Rosemount Inc., Eden Prairie, MN (US)

( * ) Notice: Subject to any disclaimer, the term of this patent is extended or adjusted under 35 U.S.C. 154(b) by 1021 days.

(21) Appl. No.: 10/804,547

(22) Filed: Mar. 18, 2004

(65) Prior Publication Data

US 2005/0225035 A1  Oct. 13, 2005

(51) Int. Cl.
*G01L 19/04* (2006.01)
*F16J 3/00* (2006.01)

(52) U.S. Cl. .......................... 73/706; 277/315

(58) Field of Classification Search .................. 73/706, 73/708; 277/315
See application file for complete search history.

(56) References Cited

U.S. PATENT DOCUMENTS

| 5,495,768 | A  | 3/1996 | Louwagie et al. ............ 73/706 |
| 5,709,337 | A  | 1/1998 | Moser et al. ............ 228/124.6 |
| 6,038,961 | A  | 3/2000 | Filippi et al. ................... 92/98 |
| 6,059,254 | A  | 5/2000 | Sundet et al. ............... 248/678 |
| 6,120,033 | A  | 9/2000 | Filippi et al. ............... 277/315 |
| 7,258,017 | B1* | 8/2007 | Hedtke ........................ 73/708 |
| 2005/0126296 | A1* | 6/2005 | Hedtke ........................ 73/706 |
| 2006/0162459 | A1* | 7/2006 | Broden ........................ 73/715 |
| 2007/0220985 | A1* | 9/2007 | Hedtke ........................ 73/715 |
| 2007/0234813 | A1* | 10/2007 | Hedtke ........................ 73/706 |
| 2007/0272027 | A1* | 11/2007 | Hedtke ........................ 73/756 |

FOREIGN PATENT DOCUMENTS

| DE | 2 211 609 | 9/1973 |
| DE | 25 23 869 | 12/1976 |
| DE | 297 03 013 U1 | 5/1997 |
| EP | 0 812 414 B1 | 7/2003 |

OTHER PUBLICATIONS

Model 1199 Diaphragm Seal Systems Manual. Rosemount, Fisher-Rosemount 1997, p. iii-4-2.
Office Action from German Patent Office in related German Patent Application No. 10 2005 012 439.2-52.
Office Action from Chinese Patent Office in related Chinese Patent Application No. 200510054796.X.

* cited by examiner

*Primary Examiner*—Andre J Allen
(74) *Attorney, Agent, or Firm*—Westman, Champlin & Kelly, P.A.

(57) ABSTRACT

A remote seal assembly includes a seal body and an extension. The seal body defines a cavity with a diaphragm that seals the cavity from a process fluid. The extension is connected with the seal body on a first end and is configured for connection to a capillary tube on a second end. The extension defines a bore extending from the first end to the second end that is fluidically coupled to the cavity. A length of the extension is related to a temperature of the second end of the extension such that the second end of the extension is at or below an outgassing temperature of the material used to connect the extension and the capillary tube.

24 Claims, 5 Drawing Sheets

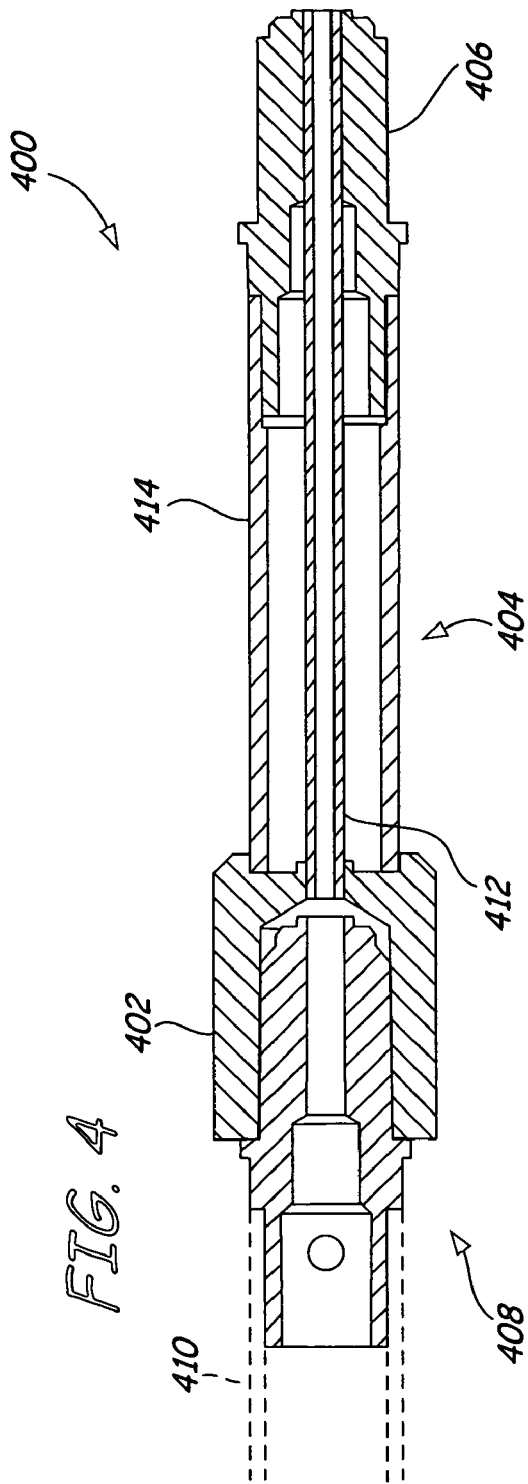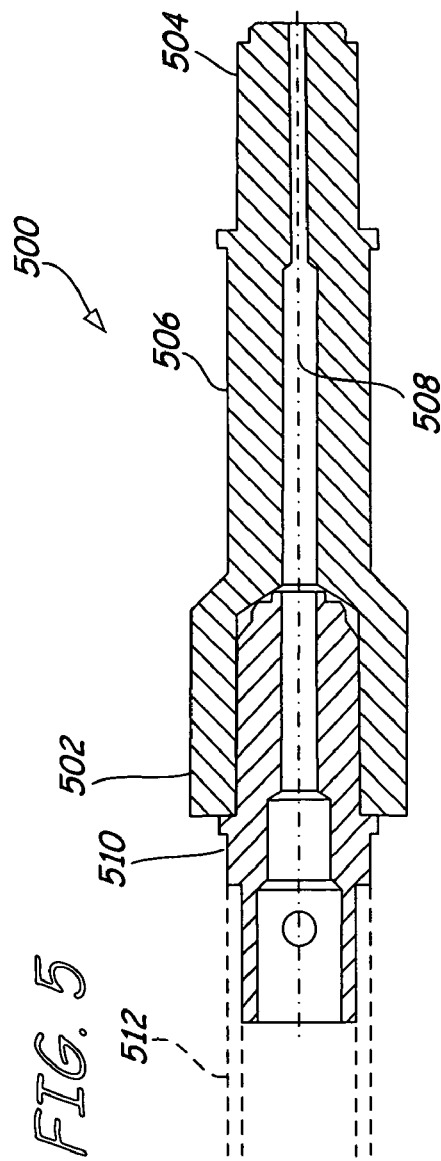

CAPILLARY WELD EXTENSION WITH THERMAL ISOLATION

BACKGROUND OF THE INVENTION

The present invention relates to remote seal assemblies. More specifically, the present invention relates a remote seal assembly including capillary weld extension with thermal isolation for coupling a process control instrument to a process fluid.

Some types of process control instruments, such as pressure transmitters, have a pressure sensor which is fluidically coupled to an isolation diaphragm by a capillary tube that is filled with a fill fluid. The isolation diaphragm comprises part of a subassembly called a "remote seal" or a "diaphragm seal", which isolates the pressure sensor from corrosive process fluids being sensed. Pressure is transferred from the isolation diaphragm to the sensor through the fill fluid, which is substantially incompressible. The capillary or tube is typically flexible and may extend for several meters. The process medium exerts pressure on the isolation diaphragm which conveys the exerted pressure to the pressure sensor disposed in a transmitter housing separate or remote from the diaphragm.

Typically, the isolation diaphragm and any process-wetted parts of the remote seal are made from a corrosion resistive material, such that the process medium does not damage the subassembly. However, the housing of the remote seal may partially contact the process medium in some embodiments. Therefore, it is sometimes necessary that the housing of the remote seal either be protected from contact with the process medium or otherwise be corrosion resistive.

Within the process control industry, remote seal systems are typically used in extreme hot and cold applications to isolate the sensor from the process environment. The remote seal fulfills this function by thermally isolating the pressure transmitter from the process with an oil filled capillary system.

Unfortunately, the metallic, corrosion resistive construction of remote seal systems is known to outgas at high temperature. The term "outgas" refers to the emission of gases, such as hydrogen, from a solid material over time. In remote seal systems, when outgassing occurs, gas diffuses from the metal and enters the seal fill fluid. Diffusion of gases into the fill fluid is detrimental to the seal performance, particularly in vacuum applications.

Two sources of outgassing have been identified in remote seal systems. One source stems from gases dissolved in a bulk of the metal during fabrication. Another source involves gases dissolved in the welds used to join remote seal components. Typically, remote seals are formed from stainless steel, hastelloy, or other corrosion resistive materials, and sometimes contaminants or other gases are trapped in the bulk of the metal during the fabrication process. During welding processes typically used to join the remote seal components, gases become trapped in the weld material, creating a source for outgassing.

Steps can be taken to reduce outgassing in remote seal assemblies. For example, ultra-pure materials can be used to fabricate the remote seal components. However, even ultra-pure materials outgas when exposed to high temperatures over a period of time.

Another possible step is to perform a high temperature vacuum bake out of the entire remote seal system. The high temperature bakeout process reduces outgassing. Unfortunately, transferring this technique to remote seals in general is challenging due to the complex offering of remote seals available.

Moreover, while remote seal metal parts can be baked out as components to address gas source problems, this technique does not address the outgassing due to the weld joints. Vacuum bake out of the welds requires an assembly bake after construction but prior to use. An assembly bake of remote seal systems is extremely undesirable because of the multiple configurations offered for capillary size, length, and armor material. The assembly bake would also have to be part of the manufacturing process, adding significant process time and requiring multiple ovens worldwide for capacity reasons. Moreover, bakeout of an assembly with a polyvinyl chloride (PVC) armored capillary tube would be largely ineffective for high temperature devices, because the PVC could not withstand the high temperature bakeout required to eliminate outgassing from the corrosion resistive remote seal body.

SUMMARY OF THE INVENTION

There is a need in the remote seal art for a capillary seal system that is not susceptible to outgassing problems. Additionally, there is a need in the art for a remote seal system that can be installed in the field without requiring new or additional equipment to prevent capillary contamination.

A remote seal assembly has a seal body and an extension. The seal body defines a cavity and has a diaphragm extending over the cavity and sealing the cavity from a process fluid. The extension is connected with the seal body on a first end and with a capillary tube on a second end. The extension defines a bore extending from the first end to the second end. A length of the extension is related to a temperature of the second end of the extension.

BRIEF DESCRIPTION OF THE DRAWINGS

FIG. 4 is a cross-sectional side view of an embodiment of the weld extension according to the present invention;

FIG. 5 is a cross-sectional side view of a machined embodiment of the weld extension according to the present invention.

DETAILED DESCRIPTION OF THE PREFERRED EMBODIMENTS

Figure 1:
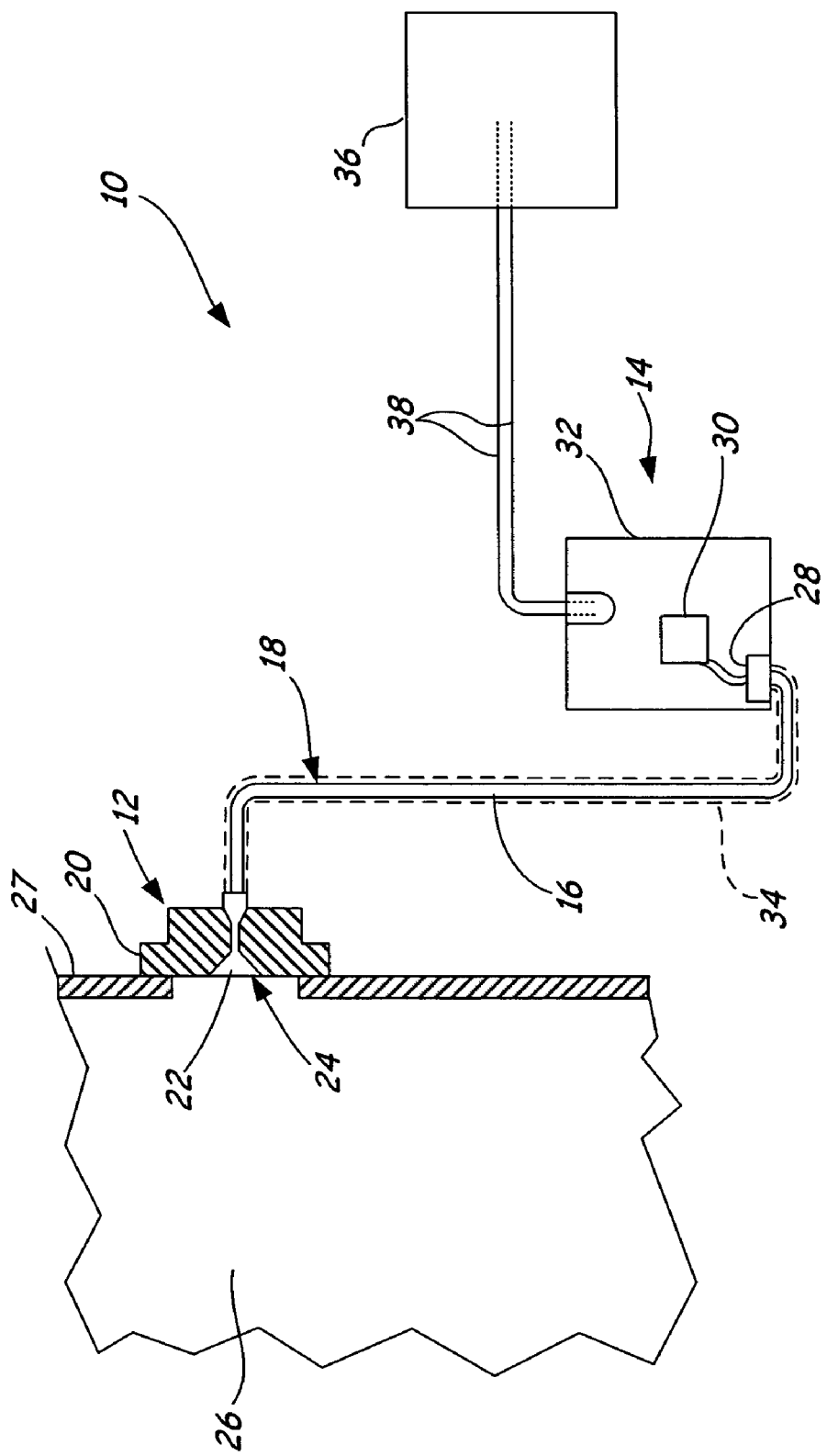
FIG. 1 is a simplified diagram showing a transmitter having a conventional flush mount remote seal assembly.

FIG. 1 shows a flush mount remote seal assembly 10 (which may be a "flanged-flush" style or a "pancake style"). Generally, the remote seal assembly 10 includes a remote seal 12 coupled to a transmitter 14 by a capillary tube 16, which is filled with a fill fluid 18. The capillary tube 16 is generally provided with capillary fittings on each end for connecting with a capillary opening (not shown) on the remote seal 12 and with a capillary connection (not shown) on the transmitter 14.

The remote seal 12 generally includes a housing (flange) 20, which defines a cavity 22. A diaphragm 24 extends across the cavity 22 in order to isolate the remote seal from the process fluid 26. The housing 20 may be provided with a fill fluid opening (not shown) for delivering the fill fluid 18 into the cavity 22 and the capillary tube 16 under a vacuum pressure. Additionally, openings (not shown) may be provided on the housing (flange) 20 for attaching the remote seal 12 to a conduit 27, a pipe, a container or other process element containing process fluid 26 to be measured.

Typically, the capillary tube 16 is welded or otherwise attached on one end to a capillary tube cavity provided in the remote seal 20, and attached at the other end to a transmitter diaphragm 28. The transmitter diaphragm 28 is coupled to a sensor 30 within a housing 32 of the transmitter 14. A support tube 34 (shown in phantom) may be provided to protect the capillary tube 16. The capillary tube 16 may be formed from metal. Other materials may also be used for the capillary tube 16, provided the capillary tubing remains flexible enough for a technician to bend and adjust during installation and sufficiently rigid that the tubing is not flexible relative to the pressure during use. In a preferred embodiment, the capillary tubing is formed from a metal.

The transmitter 14 includes a housing 32 and a sensor 30. A diaphragm 28 may also be provided to couple the capillary tube to the transmitter 14. The transmitter 14 measures the pressure of a process medium and transmits a signal representative of the measured pressure to a control center 36 via a pair of wires 38.

The remote seal assembly 10 can be referred to as a "sealed fluid system", which is filled with a suitable fill fluid 16 for transmitting the process pressure to the sensor 30 of the transmitter 14. The fluid 28 may include silicon, oil, glycerin and water, propylene, glycol and water, or any other suitable fluid, which preferably is substantially incompressible.

When process pressure is applied from the process medium, the diaphragm 24 displaces the fill fluid 18 within the cavity 22 and the capillary tube 16, thereby transmitting the pressure from the remote seal 12 to a diaphragm 28 in the transmitter 14. The process fluid 18 in turn displaces the diaphragm 28, and the sensor 30 measures the displacement of the diaphragm 28. The sensor 30 then generates a signal representative of the pressure exerted on the diaphragm 28, and the transmitter 14 sends the signal to the control center 36. The sensor 30 can operate on any known sensing principles, such as capacitance, strain gauge technology, and the like. Circuitry (not shown) within the transmitter housing 32 electronically converts the measured pressure into a transmitter output signal, which can be transmitted to a control center 36.

Unfortunately, the remote seal assembly 10 of FIG. 1 may experience outgassing when used in measuring high temperature processes. Generally, outgassing is accelerated under conditions of elevated temperature and low vacuum pressure, and both conditions are present with remote seal systems. Unfortunately, outgassing negatively affects vacuum performance. In particular, in the remote seal environment, outgassing from the weld joints or from the stainless steel sensor housing 20 can create bubbles or pockets within the vacuum fill fluid. Such bubbles or pockets act as positive pressure (an expanding gas bubble) within the vacuum, thereby affecting the accuracy of the remote seal system.

As previously discussed, sources of outgassing include the seal body 12 and weld points connecting the capillary tube 18 to the seal body 12. While high temperature bakeout processes can reduce outgassing from the seal body 20 prior to service, the process does not address the attachment welds between baked seal body 20 and the capillary tube 16.

Figure 2:
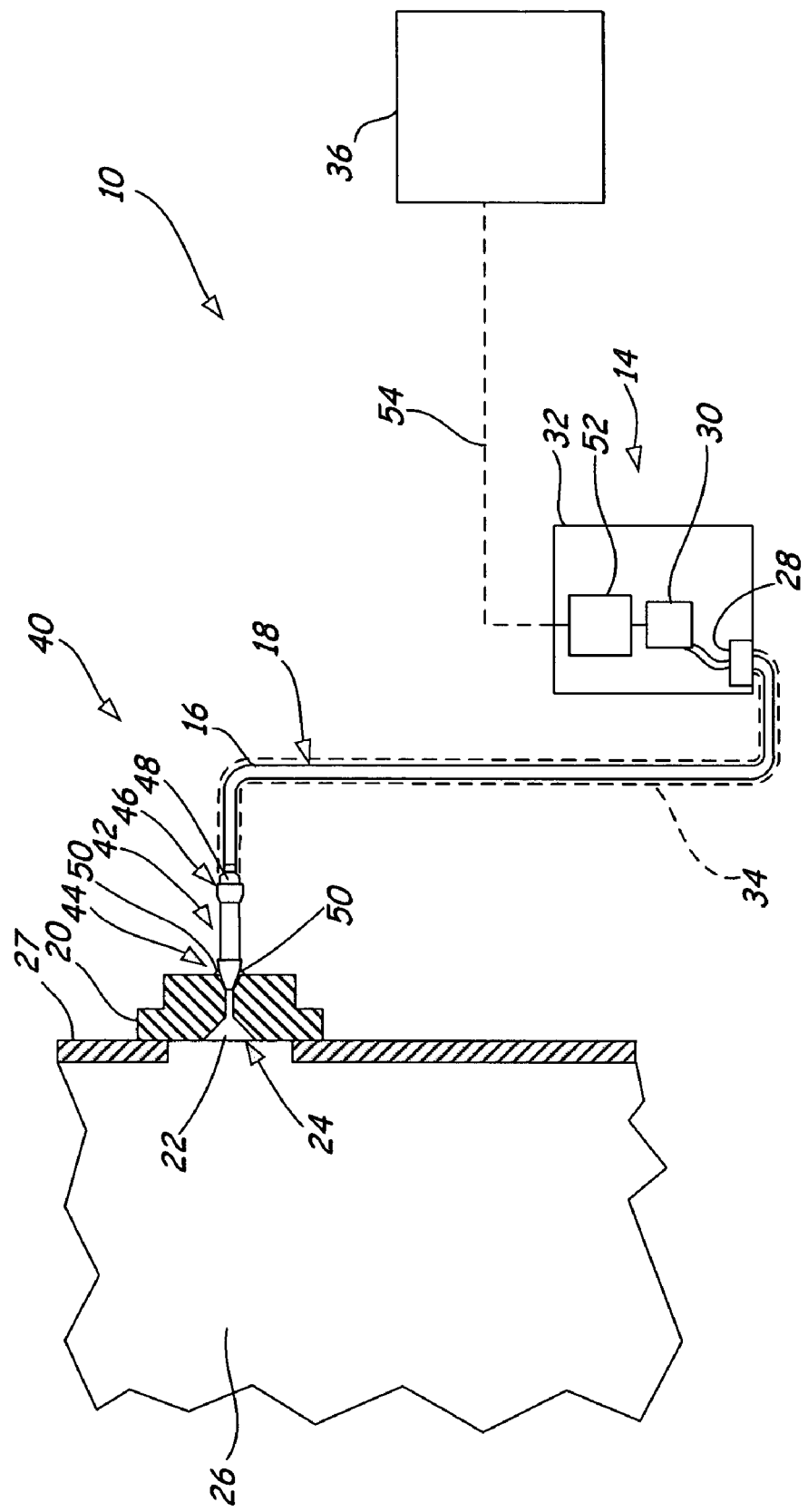
FIG. 2 is a simplified diagram showing a transmitter having a remote seal assembly according to one embodiment of the present invention.

FIG. 2 shows an embodiment of the present invention, which reduces or eliminates outgassing. To the extent that component elements remain unchanged from the conventional remote seal assembly of FIG. 1, the same reference numerals have been re-used in FIG. 2 to refer to them.

Referring now to FIG. 2, Generally, the remote seal assembly 40 of the present invention includes a remote seal 12 with a capillary weld extension 42 coupled to a transmitter 14 by a capillary tube 16, which is filled with a fill fluid 18.

As discussed above, the remote seal 12 generally includes a housing (flange) 20, which defines a cavity 22. A diaphragm 24 extends across the cavity 22 in order to isolate the remote seal from the process fluid 26. The housing 20 may be provided with a fluid fill opening (not shown) for. delivering a fluid into the cavity 22 under a vacuum pressure. Additionally, openings (not shown) may be provided on the housing (flange) 20 for attaching the remote seal 12 to a conduit 27, a pipe, a container or other process element containing process fluid 26 to be measured.

In one embodiment, the capillary weld extension 42 (which is shown in greater detail in FIGS. 3-5) is a substantially spool-shaped element having a seal body connection end 44 and a capillary connection end 46. The seal body connection end 44 is sized to fit a capillary connection opening (shown in FIG. 3) provided in the housing 20 of the remote seal 12. The capillary connection end 46 is provided with an capillary opening (shown in FIG. 3) sized to receive a capillary fitting 48 of the capillary tube 16.

In general, the capillary weld extension 42 has a bore which extends from the seal body connection end 44 to the capillary connection end 46. The connection end 44 mates with the capillary connection opening of the housing 20 and connects the cavity 22 with the capillary tube 16 via the bore (shown in FIG. 3).

The capillary weld extension 42 is attached to the housing 20 at attachment location 50. In one embodiment, the attachment is made via Tungsten Inert Gas (TIG) welding. Other types of welds and other types of attachments may also be used.

In one embodiment, after attaching the capillary weld extension 42 to the remote seal 20, the entire assembly is exposed to a bake out process, which removes impurities from the remote seal 20, the weld extension 42 and the attachment weld materials.

Typically, the capillary weld extension 42 is welded or otherwise attached on the seal body connection end 44 to the remote seal 20 and on the capillary connection end 46 to a capillary fitting 48 of the capillary tube 16. The capillary tube 16 is attached at its remote end to a transmitter diaphragm 28. The transmitter diaphragm 28 is coupled to a sensor 30 within the housing 32 of the transmitter 14. A support tube 34 (shown in phantom) may be provided to protect the capillary tube 18. The capillary tube 18 may be formed from metal or other materials. In an alternate embodiment the remote seal 20 and the capillary weld extension 42 are baked out, separately.

Generally, the transmitter 14 includes a housing 32 and a sensor 30. The transmitter 14 measures the pressure of a process medium. Processing circuitry 52 may be provided to groom the sensed data and to generate a signal representative of the measured pressure for transmission to a control center 36 via a communications link 54. The communications link 54 may be wired or wireless. If the communications link 54 is wireless, the processing circuitry 52 may be provided with a wireless transceiver circuit for transmitting wireless signals over the communications link 54. In general, the communications link 54 can be made over any medium, and the term "communications link" as used herein refers to a half-duplex or a full-duplex communication channel established between a transmitting device and a receiving device. Such a communications link can be established via a hard-wired connection, a wireless connection, a switched packet connection, or any other connection.

The capillary weld extension 42 is coupled to the remote seal 20 and to the tubing 16, and the tubing 16 is coupled to a pressure sensor 30 disposed in the transmitter housing 32. Pressure changes within the process medium 26 deflect the diaphragm 24 in the seal body, causing the fill fluid 18 within the capillary tube 16 to move. The movement of the fill fluid 18 is detected by the diaphragm 28 within the transmitter housing 32, and the sensor 30 measures the pressure. The processing circuitry 52 then generates a signal representative of the measured pressure, and sends the signal to the control center 36 via the communications link 54.

The weld extension 42 can be formed separately from the same material as the remote seal body 20. Alternatively, the weld extension 42 and the remote seal body 20 may be formed from a single unitary piece of metal. In another embodiment, the weld extension 42 and the remote seal body 20 can be formed separately and from different materials. In a preferred embodiment, the weld extension 42 and the remote seal body 20 are both formed from corrosion resistant materials such as Hastelloy, stainless steel, and the like.

The weld extension 42 and the remote seal body 20 are attached by a weld or other attachment means, and the resulting assembly can then be heated to bake out gases trapped within the bulk of the materials and any construction welds. Through this bake out process, trapped gases are eliminated prior to attachment of the capillary tube and prior to introduction of the fill fluid. The bakeout of the assembly can be done at the site that produces the seal body.

In general, the elongate shape of the weld extension 42 dissipates heat from the process fluid 26 conducted by the remote seal housing 20. The weld extension 42 conducts only a portion of the heat of the process fluid 26, effectively lowering the temperature at the capillary fitting end 46 relative to the temperature at the seal body fitting end 44. Heat conductance of the weld extension 42 is partially dependent on the thickness of the extension 42, the type of material used to produce the extension 42, the length of the extension 42, and the ambient temperature. Typically, the shape of the extension 42 will remain the same, but the length may vary, depending on the process temperature. Assuming that the ambient temperature is much less than the process temperature (which is typical), the weld extension 42 should be sufficiently long that the temperature at the capillary connection end 46 is at or below an outgassing temperature of the weld material. It will be understood by a worker skilled in the art that the outgassing temperature varies according to the materials used. The extension 42 serves as a thermal isolation extension that dissipates heat from the remote seal so that the temperature at the attachment point is below an outgassing threshold temperature for the weld material used.

In one embodiment, a weld extension 42 formed from stainless steel and having a length of approximately 3 inches was sufficient to dissipate a process temperature of about 250° C. to less than 100° C. at the capillary connection end 46. For the particular weld material used in this embodiment, extension 42 was sufficient to dissipate the heat to a temperature below the outgassing temperature of the weld material. Thus, the weld extension thermally isolates the capillary tubing 16 from the heat of the process fluid 26.

By assembling and baking the remote seal body 20 and the capillary weld extension 42 after welding them together, trapped gases are eliminated from the remote seal assembly 40. Moreover, the weld connection between the weld extension 42 and the capillary tube 16 is thermally isolated from the process temperature, reducing or eliminating concern for outgassing from that connection. Specifically, the weld extension 42 dissipates heat along its length, reducing the amount of heat delivered to the weld point between the extension 42 and the capillary tube 16. Since outgassing is a function of temperature and time, lowering the temperature of the weld connection effectively extends the amount of time before any outgassing by the weld material is expected. In other words, the extension 42 thermally isolates the weld connection of the capillary tube 16 from the process temperature, reducing or eliminating outgassing for the remote seal system.

Figure 3:
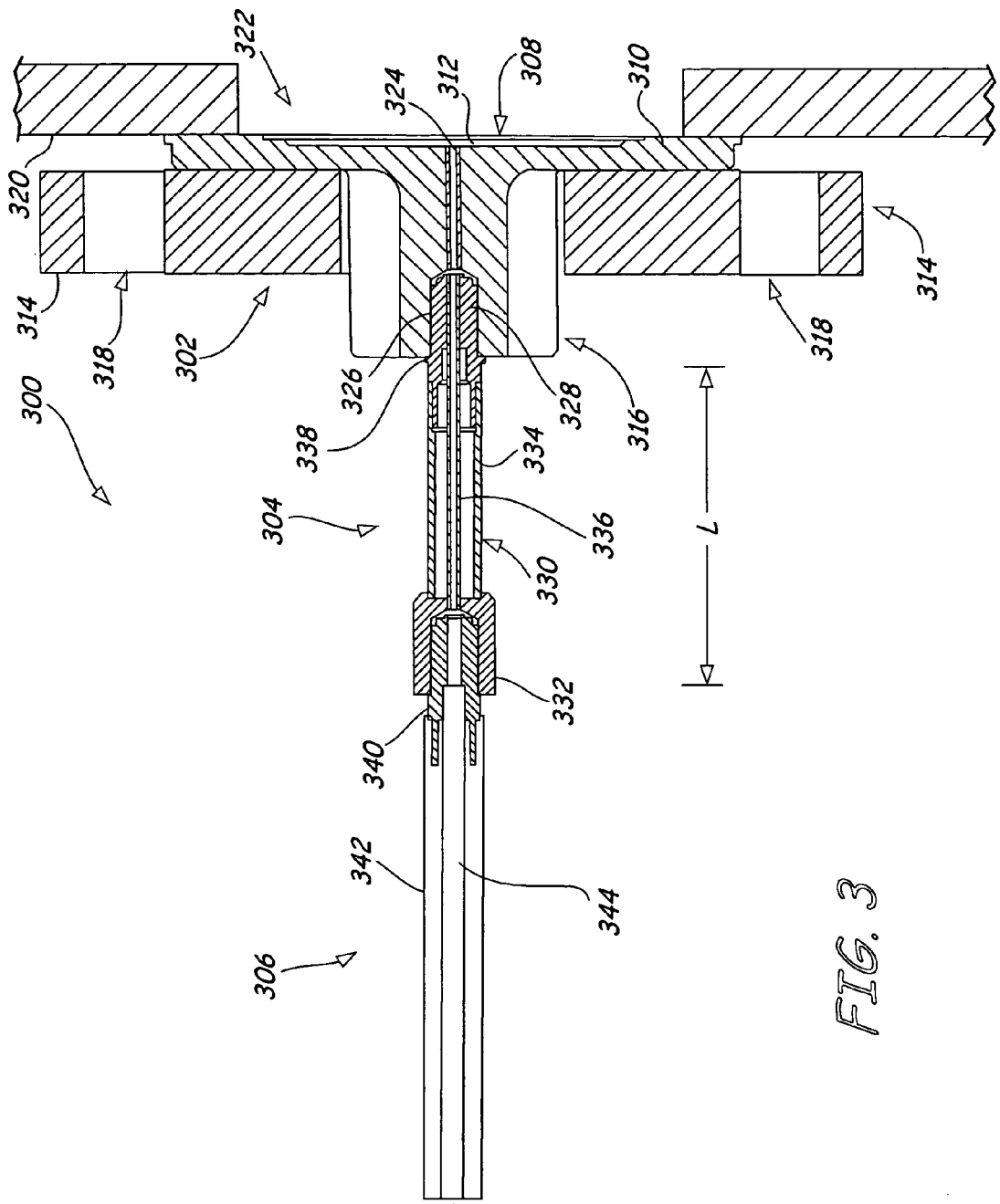
FIG. 3 is a cross-sectional side view of the remote seal assembly of FIG. 2.

Referring now to FIG. 3, an enlarged view of an embodiment of the weld extension is shown. For simplicity, new reference numerals are used to refer to the elements of the weld extension. The remote seal assembly 300 has a seal body 302 connected with a weld extension 304, which is in turn connected to a capillary tube 306.

The seal body 302 includes a thin, flexible diaphragm 308, which contacts a process fluid 322. The seal body 302 also includes a back plate 310 which, together with the diaphragm 308, define a cavity 312. The seal body 302 has a flange portion 314 and a connection portion 316. The flange portion 314 has fastener openings 318 for coupling the seal body 302 to a conduit, a pipe, a container or other process element (generally indicated by reference numeral 320) or to a mounting apparatus that is coupled to the process fluid 322.

The connection portion 316 of the seal body 302 includes an opening 326 sized to receive a universal capillary fitting 328. In general, the opening 326. extends to a bore 324 which in turn extends to the cavity 313 defined between the back plate 310 and the diaphragm 308.

A weld extension 304 is shown having an extension body 330 with a universal capillary fitting 328 formed on one end, and a capillary opening 332 sized to receive a capillary fitting formed on the other end. In the embodiment shown, the extension 304 has an outer protective cover 334, and an inner tube 336 which extends from the universal capillary fitting 328 to the capillary opening 332. The inner tube 336 is adapted to mate with the bore 324 of the seal body 302, and the tube 336 extends from the capillary opening 332 to the capillary fitting 328.

Generally, the extension 304 is a cylindrical, tube-shaped structure, having a length (L), which is defined from the capillary opening 332 to a flange portion 338 of the capillary fitting 328, and which is proportional to the process fluid temperature. The flange portion 338 is adapted to mate with the outer surface of the remote seal 302 at the weld location. As previously indicated, a length of approximately 3 inches was sufficient to dissipate a process fluid temperature of approximately 250° C. For higher process temperatures, the length (L) of the extension 304 may be adjusted to dissipate additional heat. In a preferred embodiment, the length (L) of the extension is adjusted such that the temperature conducted by the extension dissipates to a low-outgassing temperature at the connection between the capillary tube 306 and the extension 304. The low outgassing temperature is dependent on the material used to make the attachment.

Depending on on the application for which the remote seal assembly 300 is intended, higher temperatures may be expected. Additionally, depending on the weld material used, higher or lower temperatures may be desirable for the connection, meaning that the dimensions of the extension 304 may need to be adjusted to dissipate heat to a desired target temperature.

The capillary tube 306 includes a capillary fitting 304, which is attached to the capillary tubing 342. The capillary fitting 340 is generally a universal fitting, which is sized to fit within a universal capillary opening sized for receiving the capillary fitting 340, such as capillary opening 332 of the extension 304. In general, the capillary fitting 340 is substantially the same as the capillary fitting 328. The capillary tubing 342 provides a bore 344. Additional armor sleeving may be provided around the capillary tubing.

In general, the extension 304 is welded to the seal body 302 to attach the extension 304 to the seal body 302. After assembly of the capillary extension 304 to the seal body 302, the entire seal body extension assembly can be baked out to eliminate outgassing. The capillary tubing 306, and in particular the capillary fitting 340 is welded to the extension 304. The capillary tube 306 may then be attached to a remote sensor housing, and the entire system is evacuated and fluid filled. In each embodiment, the weld extension 304 is intended to dissipate sufficient heat that the weld of the capillary fitting 340 does not experience any significant outgassing.

FIG. 4 illustrates an embodiment of the extension 400 of the present invention. In this embodiment, the extension 400 is provided with the universal connection 402 to a capillary fitting, a body portion 404, and a capillary connection 406 for connecting to the seal body (shown in FIGS. 1-3). In this embodiment, the universal connection 402 is sized to receive a capillary fitting 408 from a capillary tube 410. A small ID tubing 412 extends from the universal connection 402 through the body portion 404 to the capillary connection 406, fluidically connecting the cavity of the seal body to a bore of the capillary tubing through the extension 400.

A rigid support tube 414 may be used to form the body portion 404 of the extension 400, connecting the universal connection 402 and the capillary fitting 406 by welds. The support tube 414 provides a rigid structure surrounding the small ID tubing 412. In this instance, connections the rigid support tube 414, the universal connection 402 and the capillary fitting 406 may be welded and baked out during the bakeout process.

FIG. 5 illustrates an alternative embodiment of the present invention, wherein the extension 500 is machined. As shown, the extension has a universal connection 502, a capillary fitting connection 504, and a body portion 506 connecting the universal connection 502 to the body connection 504. A bore 508 extends from the universal connection 502 through the body portion 506 to the capillary fitting connection 504 along a longitudinal axis of the extension 500. The bore 508 connects the cavity of the seal body to the bore of the capillary tube.

In the embodiment shown, a capillary fitting 510 is connected to the extension 500, and is inserted in the universal connector 502. The capillary tube 512 is attached to the capillary fitting 510 at its other end.

Figure 6:
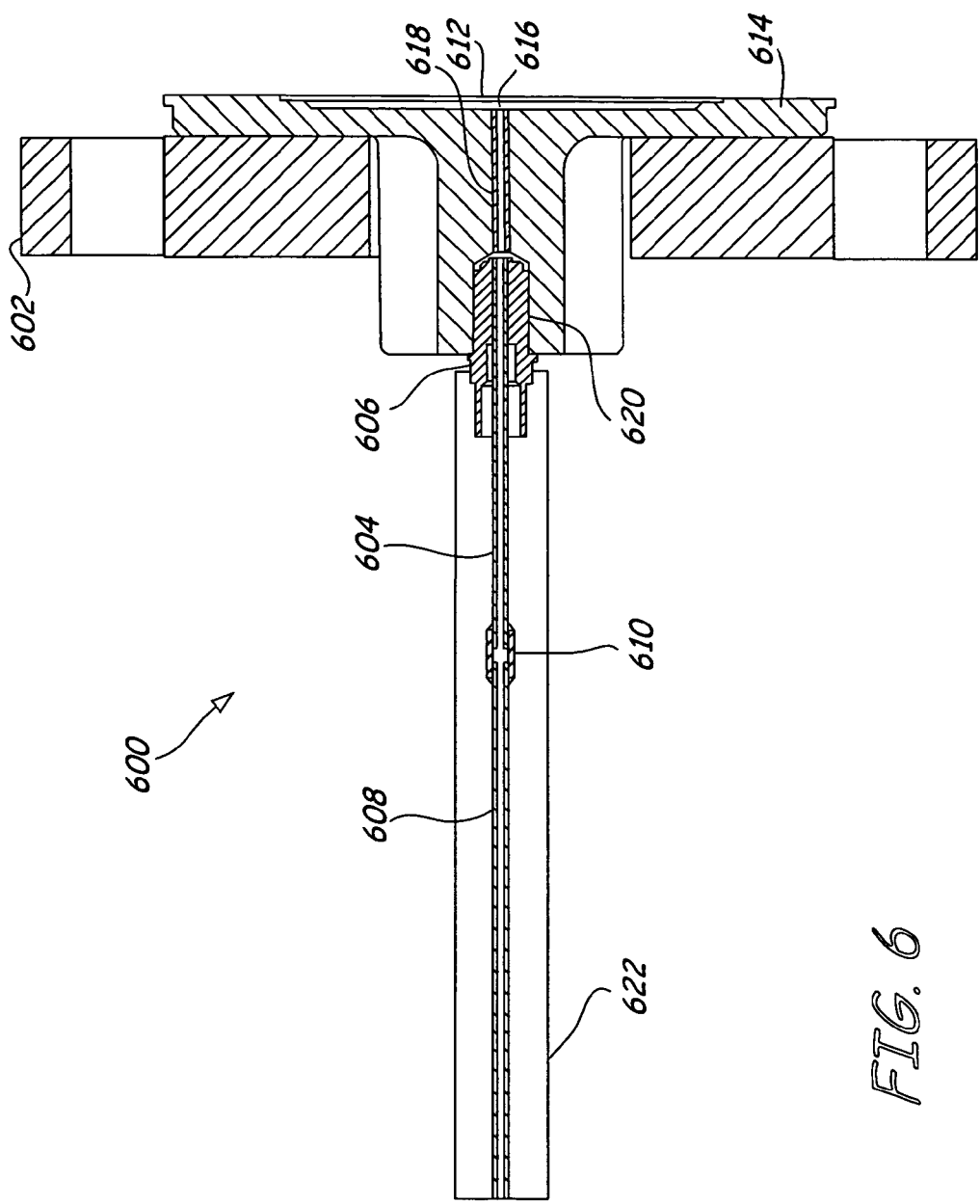
FIG. 6 is an alternative embodiment of the weld extension according to the present invention.

FIG. 6 illustrates another embodiment of the present invention. As shown, the remote seal assembly 600 has a seal body 602, a pigtail extension tube 604 attached to the seal body 602 via a capillary fitting 606, and a capillary tube 608 attached to the pigtail extension tube 604 via a tube weld coupling 610.

In this embodiment, the seal body 602 includes a diaphragm 612 in contact with a process fluid (not shown). A backplate 614 in conjunction with the diaphragm 612 defines a cavity 616, which is fluidically coupled to a bore 618. The bore 618 extends from the cavity 616 to a universal connection opening 620, sized to receive a capillary fitting 606.

The pigtail extension tube 604 is welded to the capillary fitting 606. In this embodiment, the pigtail extension tube 604 is welded to the capillary fitting 606, which is in turn welded to the seal body 602. The pigtail extension tube 604 is baked out with the seal body 602 to eliminate outgassing. After the bake out process, the capillary tube 608 is coupled to the pigtail extension 604 via a tube weld coupling 610.

To protect the capillary tube 608 and the pigtail extension 604, an armor sleeve 622 may be added to the assembly 600. In this embodiment, the pigtail extension 604 is sized to dissipate heat from the process fluid. All welds connecting the pigtail extension 604 to the seal body 602 are baked out, and the tube weld coupling 610 is sufficiently isolated from the process fluid to eliminate outgassing concerns. The weld points of the armor sleeve 622 are external to the seals, so the weld points of the armor sleeve do not expose the vacuum of the capillary tube to outgassing.

In one embodiment, the seal body and the capillary extension are machined independently. The capillary extension has a seal body fitting and a capillary fitting on opposing ends of the extension. The seal body fitting is sized to fit a cavity of the seal body. The capillary extension and the seal body can then be assembled, welded together such that the seal fitting is welded to or within the seal body cavity, and then baked out to remove or to eliminate outgassing from the assembly. The capillary can be welded to the capillary fitting of the weld extension, instead of being welded directly to the seal body. In an alternative embodiment, the seal body and the weld extension are formed from a unitary piece of metal. Finally, the entire assembly can be evacuated and fluid filled before shipping to a customer.

In general, the length of the weld extension varies according to the temperature of the process environment and according to the outgassing characteristics of the weld material used to connect the capillary tube to the thermal isolation extension. At extreme temperatures, in excess of 250° C., the length of the weld extension may need to be adjusted in order to dissipate more heat along its length prior to the weld fitting. In a preferred embodiment, it is desirable that the temperature of the assembly at the weld point of the capillary tubing be at or below an outgassing temperature of the weld material during use. As previously mentioned, outgassing is a function of both temperature and time. Outgassing occurs even at lower temperatures; however, as the temperature drops, the period of time for outgassing to occur is extended proportionally.

While the extension has been described with respect to one illustrative extension having a length of three inches, other lengths are possible, based on the geometry and the material thickness. The extension should be designed to provide sufficient thermal isolation to maintain all non-baked materials and weld points of the assembly at low outgassing temperatures. In one embodiment, the desired low outgassing temperature is 100° C.

Although the present invention has been described with reference to preferred embodiments, workers skilled in the art will recognize that changes may be made in form and detail without departing from the spirit and scope of the invention.

What is claimed is:

1. A remote seal assembly for use with a pressure transmitter coupled to a capillary tube comprising:
   a seal body defining a cavity and having a isolation diaphragm which seals the cavity from a process fluid; and
   a thermal isolation extension connected to the cavity of the seal body on a first end and configured to connect to the capillary tube on a second end, the extension defining a bore extending from the first end to the second end;
   wherein the thermal isolation extension is configured to thermally isolate the capillary tube from the seal body.

2. The remote seal assembly of claim 1 wherein the capillary tube and the second end of the thermal isolation extension are connected by a weld.

3. The remote seal assembly of claim 1 wherein the seal body further comprises:
   a universal capillary connection connected to the cavity and sized to receive a capillary fitting.

4. The remote seal assembly of claim 3 wherein the thermal isolation extension further comprises:
   a capillary fitting disposed on the first end, the capillary fitting adapted to fit the universal capillary connection.

5. The remote seal assembly of claim 1 wherein the thermal isolation extension further comprises:
   a universal capillary connector disposed on the second end and sized to receive a capillary fitting of the capillary tube.

6. The remote seal assembly of claim 5 wherein the capillary tube has a capillary fitting for connecting with the universal capillary connector.

7. The remote seal assembly of claim 1 wherein the seal body and the thermal isolation extension are formed from corrosion resistant materials.

8. The remote seal assembly of claim 1 wherein the connection between the seal body and the thermal isolation extension is a weld connection.

9. The remote seal assembly of claim 1 wherein the assembly is exposed to a bake out process.

10. The remote seal assembly of claim 1 wherein the thermal isolation extension comprises:
    a universal capillary fitting;
    a universal capillary connector; and
    an extension body adapted to connect the capillary fitting and the capillary connector, the extension body defining a bore extending from the capillary fitting to the capillary connector.

11. The remote seal assembly of claim 10 wherein the thermal isolation extension body comprises:
    an inner tube defining the bore; and
    an outer sheath sized to fit around the inner tube, the outer sheath being sufficiently rigid to prevent undesired bending of the inner tube.

12. A method for producing a remote seal assembly, the method comprising:
    forming a seal body adapted to interact with a process fluid, the seal body defining a cavity that is isolated from the process fluid by a diaphragm;
    forming an thermal isolation extension adapted to mate with the seal body;
    welding the thermal isolation extension to the seal body to form an assembly; and
    exposing the assembly to a bake out process prior to connecting to a capillary tube.

13. The method of claim 12 wherein the step of forming the thermal isolation extension comprises:
    welding a tube to a capillary fitting on a first end and to a capillary connector on an second end.

14. The method of claim 12 wherein the step of forming the thermal isolation extension comprises:
    machining the thermal isolation extension from a unitary piece of corrosion resistant material.

15. The method of claim 14 wherein the step of machining comprises:
    cutting away material along an outer surface to reduce a thickness of the thermal isolation extension; and
    drilling a bore along an axis of the thermal isolation extension, the bore extending an entire length of the thermal isolation extension.

16. The method of claim 14 wherein the thermal isolation extension is a pigtail tube attached to a capillary fitting.

17. The method of claim 12 wherein the seal body and the thermal isolation extension are formed from corrosion resistive materials.

18. A remote seal assembly formed according to the method of claim 12.

19. A remote seal assembly for use with a pressure transmitter coupled to a capillary tube comprising:
    a seal body defining a cavity that is fluidically isolated from a process fluid by a diaphragm; and
    a thermal isolation extension coupled to the cavity of the seal body, the thermal isolation extension defining a bore extending from the seal body to the capillary tube;
    wherein the thermal isolation extension is configured to thermally isolate the capillary tube from the seal body.

20. The assembly of claim 19 wherein the thermal isolation extension has a length sufficient to dissipate heat from the seal body such that a temperature of the thermal isolation extension at a connection with the capillary tube is at a low outgassing temperature.

21. The assembly of claim 20 wherein the low outgassing temperature is less than 100 degrees Celsius.

22. The assembly of claim 19 wherein the thermal isolation extension comprises:
    a capillary fitting;
    a capillary connector; and
    a rigid tube connecting the fitting and the connector, the rigid tube defining a bore extending from the fitting to the connector and fluidically coupled to the cavity of the seal body.

23. The assembly of claim 19 wherein the thermal isolation extension comprises:
    a pigtail tube attached to the seal body and a tube weld coupling for connecting the pigtail tube to the capillary tube.

24. The assembly of claim 19 wherein the thermal isolation extension and the capillary tube are connected via a weld connection.

* * * * *